United States Patent
Okano et al.

(10) Patent No.: US 9,697,937 B2
(45) Date of Patent: Jul. 4, 2017

(54) NI—ZN—CU-BASED FERRITE PARTICLES, GREEN SHEET COMPRISING THE NI—ZN—CU-BASED FERRITE PARTICLES AND NI—ZN—CU-BASED FERRITE SINTERED CERAMICS

(71) Applicant: TODA KOGYO CORP., Otake-shi, Hiroshima-ken (JP)

(72) Inventors: Yoji Okano, Otake (JP); Tomohiro Dote, Otake (JP); Takanori Doi, Otake (JP)

(73) Assignee: TODA KOGYO CORP., Hiroshima (JP)

( * ) Notice: Subject to any disclaimer, the term of this patent is extended or adjusted under 35 U.S.C. 154(b) by 387 days.

(21) Appl. No.: 14/378,140

(22) PCT Filed: Feb. 7, 2013

(86) PCT No.: PCT/JP2013/052877
§ 371 (c)(1),
(2) Date: Aug. 12, 2014

(87) PCT Pub. No.: WO2013/121972
PCT Pub. Date: Aug. 22, 2013

(65) Prior Publication Data
US 2015/0028251 A1  Jan. 29, 2015

(30) Foreign Application Priority Data
Feb. 13, 2012 (JP) ................. 2012-028877

(51) Int. Cl.
| C04B 35/30 | (2006.01) |
| C01G 53/00 | (2006.01) |
| C01G 49/00 | (2006.01) |
| H01F 1/34 | (2006.01) |
| H01F 1/01 | (2006.01) |
| C04B 35/26 | (2006.01) |
| H01F 41/02 | (2006.01) |

(52) U.S. Cl.
CPC ............ *H01F 1/01* (2013.01); *C01G 53/006* (2013.01); *C04B 35/26* (2013.01); *H01F 1/344* (2013.01); *H01F 41/0246* (2013.01); *C01P 2002/32* (2013.01); *C01P 2006/12* (2013.01); *C01P 2006/42* (2013.01); *C04B 2235/3279* (2013.01); *C04B 2235/3281* (2013.01); *C04B 2235/3284* (2013.01); *C04B 2235/5409* (2013.01); *C04B 2235/602* (2013.01); *C04B 2235/77* (2013.01)

(58) Field of Classification Search
CPC ... H01F 1/344; H01F 1/36; H01F 1/37; C04B 35/265; C04B 2235/80; C04B 2235/3284; C04B 2235/3281; C04B 2235/3279
See application file for complete search history.

(56) References Cited

U.S. PATENT DOCUMENTS

| 5,518,641 | A | 5/1996 | Inuzuka et al. |
| 5,683,617 | A | 11/1997 | Inuzuka et al. |
| 6,187,218 | B1 | 2/2001 | Kodama et al. |
| 7,311,854 | B2 * | 12/2007 | Takenoshita ....... C01G 49/0063 252/62.57 |
| 8,470,194 | B2 | 6/2013 | Okano et al. |
| 8,889,029 | B2 * | 11/2014 | Takenoshita ............ H01F 1/344 252/62.6 |
| 2010/0163779 | A1 | 7/2010 | Okano et al. |
| 2013/0126264 | A1 | 5/2013 | Takenoshita |

FOREIGN PATENT DOCUMENTS

| JP | 08-203719 | 8/1996 |
| JP | 2002-104871 | 4/2002 |
| JP | 2004-323283 | 11/2004 |
| JP | 2005-47773 | 2/2005 |
| JP | 2007-169115 | 7/2007 |
| WO | WO 2012/018052 | * 2/2012 |

OTHER PUBLICATIONS

European Patent Office, "Communication with Search Report," issued in connection with European Patent Application No. 13748822.7, dated Jun. 22, 2015 (5 pages).
English language version of International Preliminary Report on Patentability in PCT/JP2013/052877 dated Aug. 28, 2014.

* cited by examiner

*Primary Examiner* — Carol M Koslow
(74) *Attorney, Agent, or Firm* — Nixon & Vanderhye P.C.

(57) ABSTRACT

An object of the present invention is to provide a ferrite material that is excellent in temperature characteristic and DC superimposition characteristic. The present invention relates to Ni—Zn—Cu-based ferrite particles comprising 70 to 95% by weight of an Ni—Zn—Cu ferrite having a specific composition, 1 to 20% by weight of nickel oxide, 0 to 20% by weight of zinc oxide and 1 to 10% by weight of copper oxide, and a ferrite sintered ceramics obtained by sintering the ferrite particles.

6 Claims, No Drawings

NI—ZN—CU-BASED FERRITE PARTICLES, GREEN SHEET COMPRISING THE NI—ZN—CU-BASED FERRITE PARTICLES AND NI—ZN—CU-BASED FERRITE SINTERED CERAMICS

This application is the U.S. national phase of International Application No. PCT/JP2013/052877 filed 7 Feb. 2013 which designated the U.S. and claims priority to JP Patent Application No. 2012-28877 filed 13 Feb. 2012, the entire contents of each of which are hereby incorporated by reference.

TECHNICAL FIELD

The present invention relates to Ni—Zn—Cu-based ferrite particles, and more particularly, to an Ni—Zn—Cu-based ferrite material that is excellent in DC (direct current) superimposition characteristic and temperature characteristic by compounding nickel oxide, zinc oxide and copper oxide into Ni—Zn—Cu ferrite to form a composite thereof.

BACKGROUND ART

In recent years, with respect to electronic equipments such as mobile equipments and information equipments, there is a rapid demand for reduced size and enhanced performance of these equipments. With this tendency, it has also been required to reduce a size of parts used in these equipments such as inductance devices and impart a high performance thereto. In particular, inductance devices used in power supply circuits have been required to minimize the deterioration in inductance and the increase in core loss as DC superimposition characteristic observed when flowing AC and DC therethrough in a superimposed manner. In addition, the inductance devices for power supply circuits undergo generation of heat and therefore temperature rise when used under the condition in which a large amount of AC is flowed therethrough. Therefore, it has been required that the inductance devices have a less change in temperature dependence of magnetic permeability even when exposed to the temperature rise.

To meet these requirements, there have been proposed Ni—Zn—Cu-based ferrites to which various additives are added. There are known Ni—Zn—Cu-based ferrite to which silicon oxide is added (Patent Document 1), Ni—Zn—Cu-based ferrite to which bismuth oxide, tin oxide and chromium oxide are added (Patent Document 2) and the like.

CITATION LIST

Patent Literatures

Patent Document 1: Japanese Patent Application Laid-Open (KOKAI) No. 2008-290931
Patent Document 2: Japanese Patent Application Laid-Open (KOKAI) No. 2007-63123

SUMMARY OF THE INVENTION

Problem to be Solved by the Invention

In the above Patent Document 1, it is described that the Ni—Zn—Cu-based ferrite to which silicon oxide is added is excellent in DC superimposition characteristic for magnetic permeability and core loss when a magnetic flux density thereof is set to 25 mT. In order to set the magnetic flux density of the Ni—Zn—Cu-based ferrite to 25 mT, it is required that an AC magnetic field as large as about several hundreds of A/m, i.e., a large amount of AC, is applied thereto. This means that the ferrite is excellent in DC superimposition characteristic even when applying a large AC thereto. However, in Patent Literature, since no temperature characteristic is taken into consideration, it is unclear whether or not the Ni—Zn—Cu-based ferrite can maintain desired properties even when exposed to temperature rise upon operation of the circuits.

In the above Patent Document 2, it is described that the Ni—Zn—Cu-based ferrite to which bismuth oxide, tin oxide and chromium oxide are added is excellent in DC superimposition characteristic and temperature characteristic. However, the magnetic field applied upon measurement of the DC superimposition characteristic is as low as about 1 A/m. Therefore, it is unclear whether or not the Ni—Zn—Cu-based ferrite can exhibit an excellent DC superimposition characteristic even when flowing a large AC therethrough.

In consequence, an object of the present invention is to provide a ferrite material that is excellent in not only temperature characteristic but also DC superimposition characteristic even when applying a large AC magnetic field thereto, without adding a compound such as silicon oxide, bismuth oxide or chromium oxide thereto.

Means for Solving the Problem

The above object can be achieved by the following aspects of the present invention.

That is, according to the present invention, there are provided Ni—Zn—Cu-based ferrite particles comprising 70 to 95% by weight of an Ni—Zn—Cu ferrite, 1 to 20% by weight of nickel oxide and 1 to 10% by weight of copper oxide, which Ni—Zn—Cu ferrite has a composition comprising 35 to 45 mol % of $Fe_2O_3$, 10 to 20 mol % of NiO, 30 to 40 mol % of ZnO and 6 to 15 mol % of CuO in terms of the respective oxides (Invention 1).

Also, there are provided Ni—Zn—Cu-based ferrite particles comprising 70 to 95% by weight of an Ni—Zn—Cu ferrite, 1 to 20% by weight of nickel oxide, not more than 20% by weight of zinc oxide and 1 to 10% by weight of copper oxide, which Ni—Zn—Cu ferrite has a composition comprising 35 to 45 mol % of $Fe_2O_3$, 10 to 20 mol % of NiO, 30 to 40 mol % of ZnO and 6 to 15 mol % of CuO in terms of the respective oxides (Invention 2).

In addition, there is provided a green sheet comprising the Ni—Zn—Cu-based ferrite particles as described in the above Invention 1 or 2 and a binder material which are formed into a sheet shape (Invention 3).

Further, there is provided an Ni—Zn—Cu-based ferrite sintered ceramics comprising 70 to 95% by weight of an Ni—Zn—Cu ferrite, 1 to 20% by weight of nickel oxide and 1 to 10% by weight of copper oxide, which Ni—Zn—Cu ferrite has a composition comprising 35 to 45 mol % of $Fe_2O_3$, 10 to 20 mol % of NiO, 30 to 40 mol % of ZnO and 6 to 15 mol % of CuO in terms of the respective oxides (Invention 4).

Furthermore, there is provided an Ni—Zn—Cu-based ferrite sintered ceramics comprising 70 to 95% by weight of an Ni—Zn—Cu ferrite, 1 to 20% by weight of nickel oxide, not more than 20% by weight of zinc oxide and 1 to 10% by weight of copper oxide, which Ni—Zn—Cu ferrite has a composition comprising 35 to 45 mol % of $Fe_2O_3$, 10 to 20 mol % of NiO, 30 to 40 mol % of ZnO and 6 to 15 mol % of CuO in terms of the respective oxides (Invention 5).

Also, there is provided the Ni—Zn—Cu-based ferrite sintered ceramics as described in the above Invention 4 or 5, wherein a magnetic permeability $\mu_0$ of the Ni—Zn—Cu-based ferrite sintered ceramics as measured under the condition that no DC superimposition magnetic field is applied thereto is in the range of 20 to 170; a core loss $P_0$ of the Ni—Zn—Cu-based ferrite sintered ceramics as measured under the condition that no DC superimposition magnetic field is applied thereto is not more than 500 kW/m$^3$; a ratio of a magnetic permeability $\mu_{1000}$ of the Ni—Zn—Cu-based ferrite sintered ceramics as measured under the condition that a DC superimposition magnetic field of 1000 A/m is applied thereto to the magnetic permeability $\mu_0$ ($\mu_{1000}/\mu_0$) is not less than 0.4; a ratio of a core loss $P_{1000}$ of the Ni—Zn—Cu-based ferrite sintered ceramics as measured under the condition that a DC superimposition magnetic field of 1000 A/m is applied thereto to the core loss $P_0$ ($P_{1000}/P_0$) is in the range of 0.7 to 2.0; and a rate of change in the magnetic permeability $\mu_0$ relative to a temperature as measured at 100° C. is not more than 10% (Invention 6).

Effect of the Invention

Since the sintered ceramics obtained by sintering the Ni—Zn—Cu-based ferrite particles of the present invention is excellent in not only temperature characteristic but also DC superimposition characteristic when applying a large AC magnetic field thereto, the Ni—Zn—Cu-based ferrite particles are suitable as ferrite particles for inductance devices.

Since the sintered ceramics obtained by sintering the green sheet of the present invention is excellent in not only temperature characteristic but also DC superimposition characteristic when applying a large AC magnetic field thereto, the green sheet is suitable as a green sheet for inductance devices.

The Ni—Zn—Cu-based ferrite sintered ceramics according to the present invention is excellent in not only temperature characteristic but also DC superimposition characteristic when applying a large AC magnetic field thereto and, therefore, suitable as a ferrite sintered ceramics for inductance devices.

PREFERRED EMBODIMENTS FOR CARRYING OUT THE INVENTION

The construction of the present invention is described in detail below.

First, the Ni—Zn—Cu-based ferrite particles according to the present invention are described.

The Ni—Zn—Cu-based ferrite particles according to the present invention comprise 70 to 95% by weight of an Ni—Zn—Cu ferrite, 1 to 20% by weight of nickel oxide, not more than 20% by weight of zinc oxide and 1 to 10% by weight of copper oxide, the Ni—Zn—Cu ferrite having a composition comprising 35 to 45 mol % of $Fe_2O_3$, 10 to 20 mol % of NiO, 30 to 40 mol % of ZnO and 6 to 15 mol % of CuO in terms of the respective oxides.

The general Ni—Zn—Cu ferrite is obtained by mixing about 50 mol % of $Fe_2O_3$ particles and a balance comprising NiO particles, ZnO particles and CuO particles as raw materials with each other, and then subjecting the resulting mixture to calcination and pulverization. In this case, since all of the raw materials mixed are reacted, a single phase spinel-type ferrite is obtained, and no residual raw materials including NiO, ZnO and CuO are present. This is because deterioration in magnetic permeability of the resulting ferrite due to unreacted residual NiO, ZnO and CuO should be avoided.

On the other hand, the Ni—Zn—Cu-based ferrite particles according to the present invention are obtained by mixing the raw materials at a ratio being out of a stoichiometric composition thereof, i.e., mixing 35 to 45 mol % of $Fe_2O_3$ particles and a balance comprising NiO particles, ZnO particles and CuO particles with each other, and then subjecting the resulting mixture to calcination and pulverization. In this case, since the amount of $Fe_2O_3$ compounded is smaller than 50 mol % as its stoichiometric amount, nickel oxide, zinc oxide and copper oxide are present as relatively excessive components, so that the resulting product is in the form of a mixture of Ni—Zn—Cu ferrite with nickel oxide, zinc oxide and copper oxide. In addition, nickel oxide, zinc oxide and copper oxide also remain as excessive components in the sintered ceramics obtained by sintering the Ni—Zn—Cu-based ferrite particles.

According to the present invention, it has been found that by controlling a composition of the Ni—Zn—Cu-based ferrite particles and contents of the respective components therein, it is possible to obtain an Ni—Zn—Cu-based ferrite sintered ceramics that is excellent in temperature characteristic and DC superimposition characteristic.

When the compositional ratio of $Fe_2O_3$ in the Ni—Zn—Cu ferrite contained in the Ni—Zn—Cu-based ferrite particles according to the present invention is less than 35 mol %, the ferrite particles tend to be deteriorated in sintering property, resulting in low sintered density of the resulting sintered ceramics. When the compositional ratio of $Fe_2O_3$ in the Ni—Zn—Cu ferrite is more than 45 mol %, the sintered ceramics obtained by sintering the ferrite particles tends to be deteriorated in temperature characteristic and DC superimposition characteristic. The compositional ratio of $Fe_2O_3$ in the Ni—Zn—Cu ferrite contained in the Ni—Zn—Cu-based ferrite particles is preferably 37 to 43 mol %.

When the compositional ratio of NiO in the Ni—Zn—Cu ferrite contained in the Ni—Zn—Cu-based ferrite particles according to the present invention is less than 10 mol %, the sintered ceramics obtained by sintering the ferrite particles tends to be deteriorated in temperature characteristic and DC superimposition characteristic. When the compositional ratio of NiO in the Ni—Zn—Cu ferrite is more than 20 mol %, $\mu_0$ of the sintered ceramics obtained by sintering the ferrite particles tends to be small, so that the inductance device obtained from the sintered ceramics tends to hardly exhibit a large inductance value. The compositional ratio of NiO in the Ni—Zn—Cu ferrite contained in the Ni—Zn—Cu-based ferrite particles is preferably 12 to 18 mol %.

When the compositional ratio of ZnO in the Ni—Zn—Cu ferrite contained in the Ni—Zn—Cu-based ferrite particles according to the present invention is less than 30 mol %, $\mu_0$ of the sintered ceramics obtained by sintering the ferrite particles tends to be small, so that the inductance device obtained from the sintered ceramics tends to hardly exhibit a large inductance value. When the compositional ratio of ZnO in the Ni—Zn—Cu ferrite is more than 40 mol %, the sintered ceramics obtained by sintering the ferrite particles tends to be deteriorated in temperature characteristic and DC superimposition characteristic. The compositional ratio of ZnO in the Ni—Zn—Cu ferrite contained in the Ni—Zn—Cu-based ferrite particles is preferably 32 to 38 mol %.

When the compositional ratio of CuO in the Ni—Zn—Cu ferrite contained in the Ni—Zn—Cu-based ferrite particles according to the present invention is less than 6 mol %, the ferrite particles tend to be deteriorated in sintering property, resulting in a low sintered density of the resulting sintered ceramics. When the compositional ratio of CuO in the Ni—Zn—Cu ferrite is more than 15 mol %, the sintered ceramics obtained by sintering the ferrite particles tends to be deformed during the sintering step, so that it may be difficult to obtain a sintered ceramics having a desired shape. The compositional ratio of CuO in the Ni—Zn—Cu ferrite contained in the Ni—Zn—Cu-based ferrite particles is preferably 7 to 13 mol %.

When the content of the Ni—Zn—Cu ferrite in the Ni—Zn—Cu-based ferrite particles according to the present invention is less than 70% by weight, $\mu_0$ of the sintered ceramics obtained by sintering the ferrite particles tends to be small, so that the inductance device obtained from the sintered ceramics tends to hardly exhibit a large inductance value. When the content of the Ni—Zn—Cu ferrite in the Ni—Zn—Cu-based ferrite particles is more than 95% by weight, the sintered ceramics obtained by sintering the ferrite particles tends to be deteriorated in temperature characteristic and DC superimposition characteristic. The content of the Ni—Zn—Cu ferrite in the Ni—Zn—Cu-based ferrite particles is preferably 75 to 93% by weight.

When the content of nickel oxide in the Ni—Zn—Cu-based ferrite particles according to the present invention is less than 1% by weight, the sintered ceramics obtained by sintering the ferrite particles tends to be deteriorated in temperature characteristic and DC superimposition characteristic. When the content of nickel oxide in the Ni—Zn—Cu-based ferrite particles is more than 20% by weight, $\mu_0$ of the sintered ceramics obtained by sintering the ferrite particles tends to be small, so that the inductance device obtained from the sintered ceramics tends to hardly exhibit a large inductance value. The content of nickel oxide in the Ni—Zn—Cu-based ferrite particles is preferably 2 to 15% by weight.

When the content of zinc oxide in the Ni—Zn—Cu-based ferrite particles according to the present invention is more than 20% by weight, $\mu_0$ of the sintered ceramics obtained by sintering the ferrite particles tends to be small, so that the inductance device obtained from the sintered ceramics tends to hardly exhibit a large inductance value. The content of zinc oxide in the Ni—Zn—Cu-based ferrite particles is preferably not more than 18% by weight and more preferably 0.01 to 15% by weight. The Ni—Zn—Cu-based ferrite particles according to the present invention may exhibit their desired effects even though the content of zinc oxide therein is zero. However, in view of good industrial productivity of the Ni—Zn—Cu-based ferrite particles, it is preferred to allow the zinc oxide to be present in the ferrite particles.

When the content of copper oxide in the Ni—Zn—Cu-based ferrite particles according to the present invention is less than 1% by weight, the sintered ceramics obtained by sintering the ferrite particles tends to be deteriorated in temperature characteristic and DC superimposition characteristic. When the content of copper oxide in the Ni—Zn—Cu-based ferrite particles is more than 10% by weight, $\mu_0$ of the sintered ceramics obtained by sintering the ferrite particles tends to be small, so that the inductance device obtained from the sintered ceramics tends to hardly exhibit a large inductance value. The content of copper oxide in the Ni—Zn—Cu-based ferrite particles is preferably 1 to 8% by weight.

The Ni—Zn—Cu-based ferrite particles according to the present invention can be sintered at a temperature of not more than 950° C., i.e., can be subjected to so-called low-temperature sintering. As a result, since the ferrite particles can be sintered together with Ag, etc., at the same time, it is possible to simply form a circuit in the resulting sintered ceramics.

The Ni—Zn—Cu-based ferrite particles according to the present invention preferably have a BET specific surface area of 2 to 10 m$^2$/g. When the BET specific surface area is less than 2 m$^2$/g, the resulting ferrite particles tend to be deteriorated in sintering property, resulting in a low sintered density of the sintered ceramics obtained from the ferrite particles. When the BET specific surface area is more than 10 m$^2$/g, the resulting ferrite particles may fail to be uniformly dispersed in a solvent during the production process of the below-mentioned green sheet. The BET specific surface area of the Ni—Zn—Cu-based ferrite particles is preferably 3 to 8 m$^2$/g.

The Ni—Zn—Cu-based ferrite particles according to the present invention may be obtained by an ordinary method, i.e., by pre-calcining a raw material mixture prepared by mixing raw materials such as an oxide, a carbonate, a hydroxide, an oxalate, etc., of respective elements of the ferrite with each other at a predetermined ratio or a co-precipitation product produced by precipitating the respective elements in an aqueous solution thereof, in an atmospheric air in a temperature range of 650 to 950° C. for 1 to 20 hr, and then pulverizing the pre-calcined product into particles.

Next, the green sheet according to the present invention is described.

The term "green sheet" as used herein means a sheet obtained by mixing the above Ni—Zn—Cu-based ferrite particles with a binder material, a plasticizer and a solvent, etc., to prepare a coating material, applying the resulting coating material to form a coating film having a thickness of from several μm to several hundreds of μm using a doctor blade-type coater, etc., followed by drying the resulting coating film. The thus obtained sheets are overlapped together, and compression-bonded to each other to form a laminate, and then the resulting laminate is sintered at a desired temperature, thereby enabling production of an inductance device.

The green sheet according to the present invention comprises 2 to 20 parts by weight of the binder material and 0.5 to 15 parts by weight of the plasticizer based on 100 parts by weight of the Ni—Zn—Cu-based ferrite particles according to the present invention. The green sheet preferably comprises 4 to 15 parts by weight of the binder material and 1 to 10 parts by weight of the plasticizer based on 100 parts by weight of the ferrite particles. In addition, the solvent may remain in the resulting green sheet owing to insufficient drying after forming the film. Further, known additives such as a viscosity modifier may be added to the green sheet, if required.

Examples of the binder material include polyvinyl butyral, polyacrylic acid esters, polymethyl methacrylate, vinyl chloride, polymethacrylic acid esters, ethylene cellulose and abietic acid resins. Among these binder materials, polyvinyl butyral is preferred.

When the content of the binder material is less than 2 parts by weight, the resulting green sheet tends to become brittle. However, in order only to ensure a strength of the green sheet, it is not necessarily required to use the binder material in an amount of more than 20 parts by weight.

Examples of the plasticizer include benzyl-n-butyl phthalate, butyl butylphthalylglycolate, dibutyl phthalate, dimethyl phthalate, polyethylene glycol, phthalic acid esters, butyl stearate and methyl adipate.

When the content of the plasticizer is less than 0.5 part by weight, the resulting green sheet tends to be too hard, resulting in occurrence of cracks. When the content of the plasticizer is more than 15 parts by weight, the resulting green sheet tends to be too soft, resulting in poor handling property.

Upon production of the green sheet according to the present invention, the solvent is used in an amount of 15 to 150 parts by weight based on 100 parts by weight of the Ni—Zn—Cu-based ferrite particles. When the amount of the solvent used is out of the above-specified range, it is not possible to obtain a uniform green sheet, so that an inductance device obtained by sintering such a green sheet tends to be fluctuated in properties.

Examples of the solvent include acetone, benzene, butanol, ethanol, methyl ethyl ketone, toluene, propyl alcohol, isopropyl alcohol, n-butyl acetate and 3-methyl-3-methoxy-1-butanol.

The pressure applied upon forming a laminate of the green sheets is preferably $0.2 \times 10^4$ to $0.6 \times 10^4$ t/m$^2$.

Next, the Ni—Zn—Cu-based ferrite sintered ceramics according to the present invention is described.

In the present invention, as an index for the DC superimposition characteristic of the sintered ceramics, there is used the ratio ($\mu_{1000}/\mu_0$) of a magnetic permeability $\mu_{1000}$ of the sintered ceramics as measured under the condition that a DC superimposition magnetic field of 1000 A/m is applied thereto to a magnetic permeability $\mu_0$ of the sintered ceramics as measured under the condition that no DC superimposition magnetic field is applied thereto. The ratio $\mu_{1000}/\mu_0$ indicates a degree of deterioration in magnetic permeability of the sintered ceramics when applying a DC superimposition magnetic field of 1000 A/m thereto on the basis of the magnetic permeability of the ferrite material when applying a DC superimposition magnetic field of 0 A/m thereto. The value of the ratio $\mu_{1000}/\mu_0$ is usually not more than 1. As the value of the ratio $\mu_{1000}/\mu_0$ becomes closer to 1, the magnetic permeability of the ferrite material is more unlikely to be decreased even when applying a DC superimposition magnetic field thereto. This indicates that such a magnetic material by itself is excellent in DC superimposition characteristic.

Further, in the present invention, as an index for the DC superimposition characteristic of the sintered ceramics, there is used the ratio ($P_{1000}/P_0$) of a core loss $P_{1000}$ of the sintered ceramics as measured under the condition that a DC superimposition magnetic field of 1000 A/m is applied thereto to a core loss $P_0$ of the sintered ceramics as measured under the condition that no DC superimposition magnetic field is applied thereto. The ratio $P_{1000}/P_0$ indicates a degree of change in core loss of the sintered ceramics when applying a DC superimposition magnetic field of 1000 A/m thereto on the basis of the core loss of the ferrite material when applying a DC superimposition magnetic field of 0 A/m thereto. When the value of the ratio $P_{1000}/P_0$ is more than 1, the core loss of the sintered ceramics tends to be increased when applying a DC superimposition magnetic field thereto.

In addition, in the present invention, the temperature characteristic of the sintered ceramics is evaluated by the rate of change in magnetic permeability of the sintered ceramics which is obtained by dividing a difference between a magnetic permeability thereof as measured at 25° C. and a magnetic permeability thereof as measured at 100° C. by the magnetic permeability as measured at 25° C.

The Ni—Zn—Cu-based ferrite sintered ceramics according to the present invention is characterized by comprising 70 to 95% by weight of an Ni—Zn—Cu ferrite, 1 to 20% by weight of nickel oxide, 0 to 20% by weight of zinc oxide and 1 to 10% by weight of copper oxide, in which the Ni—Zn—Cu ferrite has a composition comprising 35 to 45 mol % of Fe$_2$O$_3$, 10 to 20 mol % of NiO, 30 to 40 mol % of ZnO and 6 to 15 mol % of CuO in terms of the respective oxides.

When the compositional ratio of Fe$_2$O$_3$ in the Ni—Zn—Cu ferrite contained in the Ni—Zn—Cu-based ferrite sintered ceramics according to the present invention is less than 35 mol %, the sintered ceramics tend to have a low sintered density. When the compositional ratio of Fe$_2$O$_3$ in the Ni—Zn—Cu ferrite contained in the Ni—Zn—Cu-based ferrite sintered ceramics is more than 45 mol %, the sintered ceramics tends to be deteriorated in temperature characteristic and DC superimposition characteristic. The compositional ratio of Fe$_2$O$_3$ in the Ni—Zn—Cu ferrite contained in the Ni—Zn—Cu-based ferrite sintered ceramics is preferably 37 to 43 mol %.

When the compositional ratio of NiO in the Ni—Zn—Cu ferrite contained in the Ni—Zn—Cu-based ferrite sintered ceramics according to the present invention is less than 10 mol %, the sintered ceramics tends to be deteriorated in temperature characteristic and DC superimposition characteristic. When the compositional ratio of NiO in the Ni—Zn—Cu ferrite contained in the Ni—Zn—Cu-based ferrite sintered ceramics is more than 20 mol %, $\mu_0$ of the sintered ceramics tends to be small, so that the inductance device obtained from the sintered ceramics tends to hardly exhibit a large inductance value. The compositional ratio of NiO in the Ni—Zn—Cu ferrite contained in the Ni—Zn—Cu-based ferrite sintered ceramics is preferably 12 to 18 mol %.

When the compositional ratio of ZnO in the Ni—Zn—Cu ferrite contained in the Ni—Zn—Cu-based ferrite sintered ceramics according to the present invention is less than 30 mol %, $\mu_0$ of the sintered ceramics tends to be small, so that the inductance device obtained from the sintered ceramics tends to hardly exhibit a large inductance value. When the compositional ratio of ZnO in the Ni—Zn—Cu ferrite contained in the Ni—Zn—Cu-based ferrite sintered ceramics is more than 40 mol %, the sintered ceramics tends to be deteriorated in temperature characteristic and DC superimposition characteristic. The compositional ratio of ZnO in the Ni—Zn—Cu ferrite contained in the Ni—Zn—Cu-based ferrite sintered ceramics is preferably 32 to 38 mol %.

When the compositional ratio of CuO in the Ni—Zn—Cu ferrite contained in the Ni—Zn—Cu-based ferrite sintered ceramics according to the present invention is less than 6 mol %, the sintered ceramics tend to have a low sintered density. When the compositional ratio of CuO in the Ni—Zn—Cu ferrite contained in the Ni—Zn—Cu-based ferrite sintered ceramics is more than 15 mol %, the sintered ceramics obtained by sintering the ferrite particles tends to be deformed during the sintering step, so that it may be difficult to obtain a sintered ceramics having a desired shape. The compositional ratio of CuO in the Ni—Zn—Cu ferrite contained in the Ni—Zn—Cu-based ferrite sintered ceramics is preferably 7 to 13 mol %.

When the content of the Ni—Zn—Cu ferrite in the Ni—Zn—Cu-based ferrite sintered ceramics according to the present invention is less than 70% by weight, $\mu_0$ of the sintered ceramics tends to be small, so that the inductance device obtained from the sintered ceramics tends to hardly exhibit a large inductance value. When the content of the Ni—Zn—Cu ferrite in the Ni—Zn—Cu-based ferrite sintered ceramics is more than 95% by weight, the sintered ceramics tends to be deteriorated in temperature characteristic and DC superimposition characteristic. The content of the Ni—Zn—Cu ferrite contained in the Ni—Zn—Cu-based ferrite sintered ceramics is preferably 75 to 93% by weight.

When the content of nickel oxide in the Ni—Zn—Cu-based ferrite sintered ceramics according to the present invention is less than 1% by weight, the sintered ceramics tends to be deteriorated in temperature characteristic and DC superimposition characteristic. When the content of nickel oxide in the Ni—Zn—Cu-based ferrite sintered ceramics is more than 20% by weight, $\mu_0$ of the sintered ceramics tends to be small, so that the inductance device obtained from the sintered ceramics tends to hardly exhibit a large inductance value. The content of nickel oxide in the Ni—Zn—Cu-based ferrite sintered ceramics is preferably 2 to 15% by weight.

When the content of zinc oxide in the Ni—Zn—Cu-based ferrite sintered ceramics according to the present invention is more than 20% by weight, $\mu_0$ of the sintered ceramics tends to be small, so that the inductance device obtained from the sintered ceramics tends to hardly exhibit a large inductance value. The content of zinc oxide in the Ni—Zn—Cu-based ferrite sintered ceramics is preferably not more than 18% by weight and more preferably 0.01 to 15% by weight. The Ni—Zn—Cu-based ferrite sintered ceramics according to the present invention may exhibit its desired effects even though the content of zinc oxide therein is zero. However, in view of good industrial productivity of the Ni—Zn—Cu-based ferrite sintered ceramics, it is preferred to allow the zinc oxide to be present in the sintered ceramics.

When the content of copper oxide in the Ni—Zn—Cu-based ferrite sintered ceramics according to the present invention is less than 1% by weight, the sintered ceramics tends to be deteriorated in temperature characteristic and DC superimposition characteristic. When the content of copper oxide in the Ni—Zn—Cu-based ferrite sintered ceramics is more than 10% by weight, $\mu_0$ of the sintered ceramics tends to be small, so that the inductance device obtained from the sintered ceramics tends to hardly exhibit a large inductance value. The content of copper oxide in the Ni—Zn—Cu-based ferrite sintered ceramics is preferably 1 to 8% by weight.

The sintered density of the Ni—Zn—Cu-based ferrite sintered ceramics according to the present invention is preferably 4.9 to 5.25 g/cm$^3$. When the sintered density is less than 4.9 g/cm$^3$, the resulting sintered ceramics tends to be deteriorated in mechanical strength, resulting in risk of breakage upon use. The sintered density of the Ni—Zn—Cu-based ferrite sintered ceramics is preferably as high as possible. However, the upper limit of the sintered density of the Ni—Zn—Cu-based ferrite sintered ceramics obtained according to the present invention is 5.25 g/cm$^3$. The sintered density of the Ni—Zn—Cu-based ferrite sintered ceramics is more preferably 4.95 to 5.2 g/cm$^3$.

The magnetic permeability $\mu0$ of the Ni—Zn—Cu-based ferrite sintered ceramics according to the present invention is preferably 20 to 170. When the magnetic permeability $\mu0$ of the Ni—Zn—Cu-based ferrite sintered ceramics is less than 20, the inductance device obtained from the sintered ceramics tends to hardly exhibit a large inductance value. When the magnetic permeability $\mu0$ of the Ni—Zn—Cu-based ferrite sintered ceramics is more than 170, the resulting sintered ceramics tends to be deteriorated in DC superimposition characteristic. The magnetic permeability $\mu0$ of the Ni—Zn—Cu-based ferrite sintered ceramics is more preferably 30 to 160.

The ratio $\mu1000/\mu0$ of the Ni—Zn—Cu-based ferrite sintered ceramics according to the present invention is preferably not less than 0.4. When the ratio $\mu1000/\mu0$ of the Ni—Zn—Cu-based ferrite sintered ceramics is less than 0.4, only an inductance device that is deteriorated in DC superimposition characteristic may be obtained from the sintered ceramics.

The core loss $P_0$ of the Ni—Zn—Cu-based ferrite sintered ceramics according to the present invention is preferably not more than 500 kW/m$^3$. When the core loss $P_0$ is more than 500 kW/m$^3$, the loss as the sintered ceramics tends to be increased, so that the inductance device obtained from the sintered ceramics tends to have a poor efficiency. The core loss $P_0$ of the Ni—Zn—Cu-based ferrite sintered ceramics is more preferably not more than 400 kW/m$^3$.

The ratio $P_{1000}/P_0$ of the Ni—Zn—Cu-based ferrite sintered ceramics according to the present invention is preferably 0.7 to 2.0. When the ratio $P_{1000}/P_0$ is out of the above-specified range, the resulting sintered ceramics tends to be deteriorated in DC superimposition characteristic. The ratio $P_{1000}/P_0$ of the Ni—Zn—Cu-based ferrite sintered ceramics is more preferably 0.8 to 1.9.

The rate of change in magnetic permeability relative to temperature of the Ni—Zn—Cu-based ferrite sintered ceramics according to the present invention is preferably not more than 10% and more preferably not more than 8% as measured at 100° C.

The Ni—Zn—Cu-based ferrite sintered ceramics according to the present invention may be produced by sintering a molded product obtained by pressure-molding the Ni—Zn—Cu-based ferrite particles of the present invention under a pressure of 0.3 to 3.0×10$^4$ t/m$^2$ using a metal mold, i.e., by a so-called powder press-molding method, or a laminate obtained by laminating the green sheets each comprising the Ni—Zn—Cu-based ferrite particles of the present invention, i.e., by a so-called green sheet method, at a temperature of 850 to 1050° C. for 1 to 20 hr, preferably 1 to 10 hr. As the molding method, there may be used any known methods, but the above-mentioned powder press-molding method or green sheet method is preferred.

When the sintering temperature is less than 850° C., the resulting sintered ceramics tends to be deteriorated in mechanical strength owing to low sintered density thereof. When the sintering temperature is more than 1050° C., the resulting sintered ceramics tends to be deformed, so that it may be difficult to obtain a sintered ceramics having a desired shape. The sintering temperature is more preferably 880 to 1020° C.

The Ni—Zn—Cu-based ferrite sintered ceramics according to the present invention may be formed into a desired shape and can be used as a magnetic material for inductance devices.

<Function>

The most important point of the present invention resides in that the Ni—Zn—Cu-based ferrite sintered ceramics obtained by sintering the Ni—Zn—Cu-based ferrite particles comprising the Ni—Zn—Cu ferrite having a specific composition as well as specific contents of nickel oxide, zinc oxide and copper oxide is excellent in temperature characteristic and DC superimposition characteristic. The reason why the temperature characteristic and DC superimposition characteristic of the sintered ceramics are enhanced, is considered by the present inventors as follows, although it is not clearly determined. That is, it is considered that nickel oxide, zinc oxide and copper oxide are present at a grain boundary of the Ni—Zn—Cu ferrite having the specific composition, so that the magnetization curve of the Ni—Zn—Cu-based ferrite sintered ceramics has a moderate inclination and shows a linear change.

EXAMPLES

Typical embodiments of the present invention are as follows.

The crystal phases forming the Ni—Zn—Cu-based ferrite particles and the Ni—Zn—Cu-based ferrite sintered ceramics and the contents of the crystal phases therein were measured using an X-ray diffraction apparatus "D8 ADVANCE" (manufactured by BRUKER AXS GmbH), and evaluated by Rietveld analysis using a software "TOPAS" attached to the apparatus.

The compositions of Ni—Zn—Cu ferrite in the Ni—Zn—Cu-based ferrite particles and the Ni—Zn—Cu-based ferrite sintered ceramics were calculated from contents of the respective elements as measured using a fluorescent X-ray analyzer "3530" (manufactured by Rigaku Denki Kogyo Co., Ltd.), and contents of the respective crystal phases determined by Rietveld analysis.

The BET specific surface area of the Ni—Zn—Cu-based ferrite particles was measured using a 4-specimen automatic specific surface area measurement and 8-specimen simultaneous deaeration apparatus "4-SORB U2" (manufactured by Yuasa Ionix Co., Ltd.).

The sintered density of the Ni—Zn—Cu-based ferrite sintered ceramics was calculated from a volume of a sample which were measured from an outer diameter thereof and a weight.

The magnetic permeability $\mu_0$ of the Ni—Zn—Cu-based ferrite sintered ceramics was determined as follows. That is, a magnetic permeability of a ring-shaped sintered ceramics around which a coil was wound was measured at 25° C. at a frequency of 1 MHz and a magnetic flux density of 15 mT using a B-H analyzer "SY-8232" (manufactured by IWATSU TEST INSTRUMENTS CORP.), under the condition that no DC superimposition magnetic field was applied thereto, and the value of the thus measured amplitude ratio magnetic permeability was determined as $\mu_0$.

The magnetic permeability $\mu_{1000}$ of the Ni—Zn—Cu-based ferrite sintered ceramics was determined as follows. That is, a magnetic permeability of a ring-shaped sintered ceramics around which a coil was wound was measured at 25° C. at a frequency of 1 MHz and a magnetic flux density of 15 mT using a B-H analyzer "SY-8232" (manufactured by IWATSU TEST INSTRUMENTS CORP.) under the condition that a DC superimposition magnetic field of 1000 A/m was applied thereto, and the value of the thus measured amplitude ratio magnetic permeability was determined as $\mu_{1000}$. The ratio $\mu_{1000}/\mu_0$ was calculated from $\mu_0$ and $\mu_{1000}$ thus measured.

The core loss $P_0$ of the Ni—Zn—Cu-based ferrite sintered ceramics was determined as follows. That is, a core loss of a ring-shaped sintered ceramics around which a coil was wound was measured at 25° C. at a frequency of 1 MHz and a magnetic flux density of 15 mT using a B-H analyzer "SY-8232" (manufactured by IWATSU TEST INSTRUMENTS CORP.) under the condition that no DC superimposition magnetic field was applied thereto, and the thus measured $P_{cv}$ value was determined as $P_0$.

The core loss $P_{1000}$ of the Ni—Zn—Cu-based ferrite sintered ceramics was determined as follows. That is, a core loss of a ring-shaped sintered ceramics around which a coil was wound was measured at 25° C. at a frequency of 1 MHz and a magnetic flux density of 15 mT using a B-H analyzer "SY-8232" (manufactured by IWATSU TEST INSTRUMENTS CORP.) under the condition that a DC superimposition magnetic field of 1000 A/m was applied thereto, and the thus measured $P_{cv}$ value was determined as $P_{1000}$. The ratio $P_{1000}/P_0$ was calculated from $P_0$ and $P_{1000}$ thus measured.

The temperature characteristic of a magnetic permeability of the Ni—Zn—Cu-based ferrite sintered ceramics was determined as follows. That is, an amplitude ratio magnetic permeability of a ring-shaped sintered ceramics around which a coil was wound was measured at 25° C. and 100° C. at a frequency of 1 MHz and a magnetic flux density of 15 mT using a B-H analyzer "SY-8232" (manufactured by IWATSU TEST INSTRUMENTS CORP.) under the condition that no DC superimposition magnetic field was applied thereto, and the temperature characteristic of a magnetic permeability was calculated from the thus measured amplitude ratio magnetic permeability.

Example 1-1

Production of Ni—Zn—Cu-Based Ferrite Particles

The respective oxide raw materials were weighed such that Ni—Zn—Cu-based ferrite obtained therefrom had a predetermined composition, and wet-mixed with each other for 20 hr using a ball mill. The resulting mixed slurry was filtered to separate a solid component therefrom, and the thus separated solid component was dried to obtain raw mixed particles. The thus obtained raw mixed particles were calcined at 830° C. for 4 hr, and the resulting pre-calcined product was pulverized using a ball mill, thereby obtaining Ni—Zn—Cu-based ferrite particles according to the present invention.

The content of Ni—Zn—Cu ferrite in the thus obtained Ni—Zn—Cu-based ferrite particles was 84.7% by weight, and the Ni—Zn—Cu ferrite had a composition comprising 40.9 mol % of $Fe_2O_3$, 14.7 mol % of NiO, 35.7 mol % of ZnO and 8.7 mol % of CuO. Also, the content of nickel oxide in the ferrite particles was 5.1% by weight, the content of zinc oxide therein was 6.4% by weight, and the content of copper oxide therein was 3.8% by weight. Further, the BET specific surface area of the Ni—Zn—Cu-based ferrite particles was 4.9 m²/g.

Example 2-1

Production of Green Sheet

Eight parts by weight of polyvinyl butyral as a binder material, 3 parts by weight of benzyl-n-butyl phthalate as a plasticizer and 50 parts by weight of 3-methyl-3-methoxy-1-butanol as a solvent were added to 100 parts by weight of the Ni—Zn—Cu-based ferrite particles obtained in Example 1-1, and the resulting mixture was fully mixed to obtain a slurry. The thus obtained slurry was applied onto a PET film using a doctor blade-type coater to form a coating film thereon. The coating film was then dried to obtain a green sheet having a thickness of 75 μm. The thus obtained ten green sheets each cut into a size of 100 mm in length×100 mm in width, were laminated and then pressed together under a pressure of 0.35×10⁴ t/m², thereby obtaining a green sheet laminate having a thickness of 0.74 mm.
<Production of Ni—Zn—Cu-Based Ferrite Sintered Ceramics>

The above obtained green sheet laminate was sintered at 900° C. for 2 hr, thereby obtaining a Ni—Zn—Cu-based ferrite sintered ceramics having a thickness of 0.62 μm. The content of Ni—Zn—Cu ferrite in the thus obtained Ni—Zn—Cu-based ferrite sintered ceramics was 84.1% by weight, and the Ni—Zn—Cu ferrite had a composition comprising 40.9 mol % of $Fe_2O_3$, 15.0 mol % of NiO, 35.4 mol % of ZnO and 8.7 mol % of CuO. Also, the content of nickel oxide in the sintered ceramics was 3.7% by weight, the content of zinc oxide therein was 8.7% by weight, and the content of copper oxide therein was 3.5% by weight. Also, the sintered density of the Ni—Zn—Cu-based ferrite sintered ceramics was 5.1 g/cm³. Further, the Ni—Zn—Cu-based ferrite sintered ceramics was cut into a ring-shaped sintered ceramics having an outer diameter of 14 mm, an inner diameter of 8 mm and a thickness of 0.62 mm using an ultrasonic machine to evaluate magnetic properties thereof. As a result, it was confirmed that the sintered ceramics had $\mu_0$ of 98, a ratio $\mu_{1000}/\mu_0$ of 0.70, a core loss $P_0$ of 140 kW/m³ and a ratio $P_{1000}/P_0$ of 1.00. Also, it was confirmed that the rate of change in magnetic permeability of the Ni—Zn—Cu-based ferrite sintered ceramics was 2.1%.

Examples 1-2 to 1-6 and Comparative Examples 1-1 to 1-5

The same procedure as in Example 1-1 was conducted except that the compositional ratios were changed variously, thereby obtaining Ni—Zn—Cu-based ferrite particles. Various properties of the thus obtained Ni—Zn—Cu-based ferrite particles are shown in Table 1.

Examples 2-2 to 2-5

Respective Ni—Zn—Cu-based ferrite sintered bodies were produced by the same method as defined in Example 2-1. The production conditions used in these Examples are shown in Table 2, and various properties of the thus obtained Ni—Zn—Cu-based ferrite sintered bodies are shown in Table 3.

Example 2-6

One hundred parts by weight of the Ni—Zn—Cu-based ferrite particles produced in the same manner as in Example 1-1 were mixed with 10 parts by weight of a 6% polyvinyl alcohol aqueous solution to obtain mixed particles. Then, 7.0 g of the thus obtained mixed particles were press-molded in a metal mold under a pressure of $1.0 \times 10^4$ t/m² to obtain a disk-shaped molded product having an outer diameter of 30 mm and a thickness of 2.9 mm. The thus obtained molded product was sintered at 900° C. for 2 hr, thereby obtaining a Ni—Zn—Cu-based ferrite sintered ceramics.

The composition, crystal phase and sintered density of the thus obtained Ni—Zn—Cu-based ferrite sintered ceramics were measured, and then the sintered ceramics was cut into a ring-shaped sintered ceramics having an outer diameter of 14 mm, an inner diameter of 8 mm and a thickness of 2 mm using an ultrasonic machine to evaluate magnetic properties thereof.

The production conditions used in this Example are shown in Table 2, and various properties of the thus obtained Ni—Zn—Cu-based ferrite sintered ceramics are shown in Table 3.

Comparative Examples 2-1 and 2-5

Respective Ni—Zn—Cu-based ferrite sintered bodies were produced by the same manner as defined in Example 2-1 or Example 2-6. The production conditions used in these Comparative Examples are shown in Table 2, and various properties of the thus obtained Ni—Zn—Cu-based ferrite sintered bodies are shown in Table 3.

TABLE 1

| | Properties of Ni—Zn—Cu-based ferrite particles Ni—Zn—Cu ferrite | | | | |
|---|---|---|---|---|---|
| No. | Content [wt %] | $Fe_2O_3$ [mol %] | NiO [mol %] | ZnO [mol %] | CuO [mol %] |
| Example 1-1 | 84.7 | 40.9 | 14.7 | 35.7 | 8.7 |
| Example 1-2 | 75.0 | 37.3 | 12.5 | 37.5 | 12.7 |
| Example 1-3 | 92.7 | 42.7 | 17.6 | 32.3 | 7.4 |
| Example 1-4 | 82.7 | 41.0 | 17.3 | 32.8 | 8.9 |
| Example 1-5 | 75.5 | 37.8 | 12.6 | 36.8 | 12.8 |
| Example 1-6 | 91.3 | 40.2 | 12.0 | 38.0 | 9.8 |
| Comp. Example 1-1 | 64.5 | 31.3 | 20.1 | 40.1 | 8.5 |
| Comp. Example 1-2 | 98.4 | 45.6 | 9.5 | 29.5 | 15.4 |
| Comp. Example 1-3 | 57.5 | 35.0 | 15.8 | 39.1 | 10.2 |
| Comp. Example 1-4 | 84.2 | 41.9 | 18.6 | 34.0 | 5.5 |
| Comp. Example 1-5 | 100.0 | 49.0 | 25.5 | 16.5 | 9.0 |

| | Properties of Ni—Zn—Cu-based ferrite particles | | | |
|---|---|---|---|---|
| No. | Nickel oxide [wt %] | Zinc oxide [wt %] | Copper oxide [wt %] | BET [m²/g] |
| Example 1-1 | 5.1 | 6.4 | 3.8 | 4.9 |
| Example 1-2 | 6.3 | 14.4 | 4.3 | 7.6 |
| Example 1-3 | 2.0 | 4.1 | 1.2 | 4.5 |
| Example 1-4 | 14.6 | 0.0 | 2.7 | 5.5 |
| Example 1-5 | 2.3 | 14.5 | 7.7 | 5.1 |
| Example 1-6 | 2.1 | 5.1 | 1.5 | 3.3 |
| Comp. Example 1-1 | 21.4 | 10.0 | 4.1 | 4.1 |
| Comp. Example 1-2 | 0.8 | 0.3 | 0.5 | 7.6 |
| Comp. Example 1-3 | 11.6 | 20.5 | 10.4 | 4.6 |
| Comp. Example 1-4 | 5.4 | 6.3 | 4.1 | 5.1 |
| Comp. Example 1-5 | 0.0 | 0.0 | 0.0 | 4.9 |

TABLE 2

| | Production conditions of Ni—Zn—Cu-based ferrite | | |
|---|---|---|---|
| No. | Molding method | Sintering temperature [° C.] | Sintering time |
| Example 2-1 | Green sheet method | 900 | 2 |
| Example 2-2 | Green sheet method | 870 | 2 |
| Example 2-3 | Green sheet method | 880 | 5 |
| Example 2-4 | Green sheet method | 900 | 2 |
| Example 2-5 | Green sheet method | 1010 | 3 |
| Example 2-6 | Powder press-molding method | 960 | 2 |
| Comp. Example 2-1 | Green sheet method | 890 | 4 |
| Comp. Example 2-2 | Green sheet method | 900 | 2 |
| Comp. Example 2-3 | Green sheet method | 930 | 2 |

TABLE 2-continued

Production conditions of Ni—Zn—Cu-based ferrite

| No. | Molding method | Sintering temperature [° C.] | Sintering time |
|---|---|---|---|
| Comp. Example 2-4 | Powder press-molding method | 900 | 3 |
| Comp. Example 2-5 | Green sheet method | 890 | 4 |

TABLE 3

Properties of Ni—Zn—Cu-based ferrite sintered ceramics
Ni—Zn—Cu ferrite

| No. | Content [wt %] | $Fe_2O_3$ [mol %] | NiO [mol %] | ZnO [mol %] | CuO [mol %] |
|---|---|---|---|---|---|
| Example 2-1 | 84.1 | 40.9 | 15.0 | 35.4 | 8.7 |
| Example 2-2 | 75.1 | 37.3 | 12.2 | 37.8 | 12.7 |
| Example 2-3 | 92.6 | 42.7 | 17.6 | 32.3 | 7.4 |
| Example 2-4 | 82.4 | 41.1 | 17.2 | 32.9 | 8.8 |
| Example 2-5 | 75.0 | 37.8 | 12.6 | 36.8 | 12.8 |
| Example 2-6 | 90.7 | 40.2 | 12.0 | 38.0 | 9.8 |
| Comp. Example 2-1 | 63.0 | 31.4 | 20.0 | 40.1 | 8.5 |
| Comp. Example 2-2 | 98.4 | 45.6 | 9.5 | 29.5 | 15.4 |
| Comp. Example 2-3 | 57.6 | 35.0 | 15.7 | 39.1 | 10.2 |
| Comp. Example 2-4 | 82.5 | 42.0 | 18.8 | 33.7 | 5.5 |
| Comp. Example 2-5 | 100.0 | 48.9 | 25.3 | 16.2 | 9.6 |

Properties of Ni—Zn—Cu-based ferrite sintered ceramics

| No. | Nickel oxide [wt %] | Zinc oxide [wt %] | Copper oxide [wt %] | Sintered density [g/cm3] |
|---|---|---|---|---|
| Example 2-1 | 3.7 | 8.7 | 3.5 | 5.12 |
| Example 2-2 | 8.0 | 12.1 | 4.8 | 4.94 |
| Example 2-3 | 2.2 | 3.8 | 1.4 | 5.08 |
| Example 2-4 | 14.9 | 0.0 | 2.7 | 5.09 |
| Example 2-5 | 2.5 | 14.7 | 7.8 | 5.23 |
| Example 2-6 | 2.3 | 5.4 | 1.6 | 5.15 |
| Comp. Example 2-1 | 21.8 | 10.8 | 4.4 | 5.02 |
| Comp. Example 2-2 | 0.8 | 0.3 | 0.5 | 5.12 |
| Comp. Example 2-3 | 11.8 | 20.3 | 10.3 | 5.19 |
| Comp. Example 2-4 | 4.2 | 8.7 | 4.6 | 4.85 |
| Comp. Example 2-5 | 0.0 | 0.0 | 0.0 | 5.11 |

Properties of Ni—Zn—Cu-based ferrite sintered ceramics

| No. | Temperature characteristic of magnetic permeability $\mu_0$ | $P_0$ [%] | DC superimposition characteristic [kW/m³] | $\mu_{1000}/\mu_0$ | $P_{1000}/P_0$ |
|---|---|---|---|---|---|
| Example 2-1 | 98 | 2.1 | 140 | 0.70 | 1.00 |
| Example 2-2 | 124 | 4.9 | 199 | 0.61 | 1.52 |
| Example 2-3 | 71 | 1.3 | 108 | 0.79 | 1.03 |
| Example 2-4 | 30 | 0.3 | 210 | 0.95 | 0.83 |
| Example 2-5 | 149 | 6.1 | 302 | 0.57 | 1.67 |
| Example 2-6 | 158 | 7.4 | 343 | 0.42 | 1.84 |
| Comp. Example 2-1 | 14 | 0.1 | 232 | 0.96 | 1.03 |
| Comp. Example 2-2 | 184 | 13.5 | 503 | 0.33 | 2.30 |
| Comp. Example 2-3 | 17 | 0.2 | 211 | 0.97 | 1.10 |
| Comp. Example 2-4 | 15 | 0.2 | 219 | 0.96 | 0.96 |
| Comp. Example 2-5 | 126 | 13.0 | 187 | 0.21 | 20.9 |

As apparently recognized from the above Examples, the Ni—Zn—Cu-based ferrite sintered ceramics according to the present invention is excellent in temperature characteristic and DC superimposition characteristic and, therefore, suitable as a magnetic material for inductance devices.

In addition, since the Ni—Zn—Cu-based ferrite sintered ceramics obtained by sintering the Ni—Zn—Cu-based ferrite particles according to the present invention is excellent in temperature characteristic and DC superimposition characteristic, the Ni—Zn—Cu-based ferrite particles are suitable as a magnetic material for inductance devices.

Further, since the Ni—Zn—Cu-based ferrite sintered ceramics obtained by sintering a green sheet produced by forming the Ni—Zn—Cu-based ferrite particles and a binder material into a sheet shape is excellent in temperature characteristic and DC superimposition characteristic, the green sheet is suitable as a magnetic material for inductance devices.

The invention claimed is:

1. Ni—Zn—Cu-based ferrite particles comprising:
   (a) 70 to 95% by weight of an Ni—Zn—Cu ferrite, wherein the Ni—Zn—Cu ferrite has a composition comprising 35 to 45 mol % of $Fe_2O_3$, 10 to 20 mol % of NiO, 30 to 40 mol % of ZnO, and 6 to 15 mol % of CuO in terms of the respective oxides;
   (b) 1 to 20% by weight of nickel oxide; and
   (c) 1 to 10% by weight of copper oxide.

2. Ni—Zn—Cu-based ferrite particles comprising:
   (a) 70 to 95% by weight of an Ni—Zn—Cu ferrite, wherein the Ni—Zn—Cu ferrite has a composition comprising 35 to 45 mol % of $Fe_2O_3$, 10 to 20 mol % of NiO, 30 to 40 mol % of ZnO and 6 to 15 mol % of CuO in terms of the respective oxides;
   (b) 1 to 20% by weight of nickel oxide;
   (c) not more than 20% by weight of zinc oxide; and
   (d) 1 to 10% by weight of copper oxide.

3. A green sheet comprising the Ni—Zn—Cu-based ferrite particles as defined in claim 1 and a binder material which are formed into a sheet shape.

4. An Ni—Zn—Cu-based ferrite sintered ceramics comprising:
   (a) 70 to 95% by weight of an Ni—Zn—Cu ferrite, wherein the Ni—Zn—Cu ferrite has a composition comprising 35 to 45 mol % of $Fe_2O_3$, 10 to 20 mol % of NiO, 30 to 40 mol % of ZnO and 6 to 15 mol % of CuO in terms of the respective oxides;
   (b) 1 to 20% by weight of nickel oxide; and
   (c) 1 to 10% by weight of copper oxide.

5. An Ni—Zn—Cu-based ferrite sintered ceramics comprising:
   (a) 70 to 95% by weight of an Ni—Zn—Cu ferrite, wherein the Ni—Zn—Cu ferrite has a composition comprising 35 to 45 mol % of $Fe_2O_3$, 10 to 20 mol % of NiO, 30 to 40 mol % of ZnO and 6 to 15 mol % of CuO in terms of the respective oxides;

(b) 1 to 20% by weight of nickel oxide;

(c) not more than 20% by weight of zinc oxide; and (d) 1 to 10% by weight of copper oxide.

6. The Ni—Zn—Cu-based ferrite sintered ceramics according to claim 4, wherein a magnetic permeability $\mu_0$ of the Ni—Zn—Cu-based ferrite sintered ceramics as measured under the condition that no DC superimposition magnetic field is applied thereto is in the range of 20 to 170; a core loss $P_0$ of the Ni—Zn—Cu-based ferrite sintered ceramics as measured under the condition that no DC superimposition magnetic field is applied thereto is not more than 500 kW/m$^3$; a ratio of a magnetic permeability $\mu_{1000}$ of the Ni—Zn—Cu-based ferrite sintered ceramics as measured under the condition that a DC superimposition magnetic field of 1000 A/m is applied thereto to the magnetic permeability $\mu_0$ ($\mu_{1000}/\mu_0$) is not less than 0.4; a ratio of a core loss $P_{1000}$ of the Ni—Zn—Cu-based ferrite sintered ceramics as measured under the condition that a DC superimposition magnetic field of 1000 A/m is applied thereto to the core loss $P_0$ ($P_{1000}/P_0$) is in the range of 0.7 to 2.0; and a rate of change in the magnetic permeability $\mu_0$ relative to a temperature as measured at 100° C. is not more than 10%.

\* \* \* \* \*